(12) United States Patent  
Lin

(10) Patent No.: US 12,114,160 B2  
(45) Date of Patent: Oct. 8, 2024

(54) METHOD AND A SYSTEM FOR ESTABLISHING A CONNECTION BETWEEN AN ON-BOARD VEHICLE NETWORK SERVICE AND AN EXTERNAL APPLICATION

(71) Applicant: VOLVO TRUCK CORPORATION, Gothenburg (SE)

(72) Inventor: Ta-Chien Lin, Mölnlycke (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 16/969,846

(22) PCT Filed: Mar. 15, 2018

(86) PCT No.: PCT/EP2018/056593  
§ 371 (c)(1),  
(2) Date: Aug. 13, 2020

(87) PCT Pub. No.: WO2019/174738  
PCT Pub. Date: Sep. 19, 2019

(65) Prior Publication Data  
US 2020/0404504 A1 Dec. 24, 2020

(51) Int. Cl.  
*H04L 9/40* (2022.01)  
*H04L 29/06* (2006.01)  
(Continued)

(52) U.S. Cl.  
CPC ........... *H04W 12/088* (2021.01); *H04W 4/40* (2018.02); *H04W 12/66* (2021.01)

(58) Field of Classification Search  
CPC ...... H04W 12/088; H04W 4/40; H04W 12/66  
(Continued)

(56) References Cited

U.S. PATENT DOCUMENTS 9,524,186 B2 * 12/2016 Shen .................. H04L 67/10  
9,526,076 B1 * 12/2016 Park .................. H04W 4/40  
(Continued)

FOREIGN PATENT DOCUMENTS

CN 101222452 A 7/2008  
CN 103686713 A 3/2014  
(Continued)

OTHER PUBLICATIONS

International Search Report and Written Opinion dated Jul. 6, 2018 in corresponding International PCT Application No. PCT/EP2018/056593, 11 pages.

(Continued)

*Primary Examiner* — Haresh N Patel  
(74) *Attorney, Agent, or Firm* — Venable LLP; Jeffri A. Kaminski

(57) ABSTRACT

The invention relates to a method and system for establishing a connection between a vehicle network service and an external application. The method comprises: in a vehicle (102), defining (S1) a trusted hotspot device (104) external to a vehicle gateway (106), the trusted hotspot device being connected to the vehicle gateway; in the trusted hotspot device, receiving (S2) a request from an application external to the vehicle requesting access to a service (108) on the vehicle network (110) via the vehicle gateway; in the vehicle gateway, determining (S3) if the requested vehicle network service is available on the vehicle network (110); and if the requested vehicle network service is available on the vehicle network, configuring (S4) the vehicle gateway to allow the requesting application to communicate with the requested vehicle network service.

15 Claims, 2 Drawing Sheets

(51) Int. Cl.
*H04W 4/40* (2018.01)
*H04W 12/088* (2021.01)
*H04W 12/60* (2021.01)

(58) Field of Classification Search
USPC .......................................................... 726/12
See application file for complete search history.

(56) References Cited

U.S. PATENT DOCUMENTS

| | | | |
|---|---|---|---|
| 10,582,443 B2* | 3/2020 | Atarius | H04L 65/611 |
| 2004/0167689 A1 | 8/2004 | Bromley et al. | |
| 2005/0259668 A1* | 11/2005 | Kim | H04L 12/2898 |
| | | | 370/401 |
| 2008/0167758 A1 | 7/2008 | Louch et al. | |
| 2009/0262714 A1 | 10/2009 | Lim et al. | |
| 2010/0159948 A1* | 6/2010 | Spivey | H04W 48/18 |
| | | | 455/456.1 |
| 2011/0153149 A1 | 6/2011 | Jeon et al. | |
| 2013/0007858 A1* | 1/2013 | Shah | H04W 12/0431 |
| | | | 726/6 |
| 2013/0298209 A1* | 11/2013 | Targali | H04W 12/06 |
| | | | 726/6 |
| 2014/0079217 A1 | 3/2014 | Bai et al. | |
| 2014/0120890 A1* | 5/2014 | Barrett | H04W 4/50 |
| | | | 455/418 |
| 2014/0121898 A1* | 5/2014 | Diab | H04L 67/12 |
| | | | 701/36 |
| 2014/0325615 A1* | 10/2014 | Scahill | H04L 63/1416 |
| | | | 726/4 |
| 2015/0006077 A1* | 1/2015 | Baid | G01C 21/3614 |
| | | | 701/538 |
| 2015/0109962 A1 | 4/2015 | Liao et al. | |
| 2016/0044129 A1* | 2/2016 | Bergmann | H04L 67/5681 |
| | | | 455/406 |
| 2016/0113043 A1* | 4/2016 | O'Brien | H04W 76/12 |
| | | | 370/338 |
| 2016/0147563 A1* | 5/2016 | Prakah-Asante | G06F 9/546 |
| | | | 719/314 |
| 2016/0308743 A1 | 10/2016 | Alam et al. | |
| 2018/0107473 A1* | 4/2018 | Ahmed | G06F 8/654 |
| 2018/0176983 A1* | 6/2018 | Subramaniyan | H04W 48/06 |
| 2018/0343262 A1* | 11/2018 | Anderson | B60R 16/0234 |
| 2019/0036934 A1* | 1/2019 | Pitchaimani | H04W 12/37 |
| 2019/0246435 A1* | 8/2019 | Hummel | G06F 3/04847 |
| 2019/0268741 A1* | 8/2019 | Shen | H04W 76/10 |

FOREIGN PATENT DOCUMENTS

| | | |
|---|---|---|
| CN | 105722253 A | 6/2016 |
| CN | 106034127 A | 10/2016 |
| EP | 2985978 A1 | 2/2016 |

OTHER PUBLICATIONS

China Office Action dated Sep. 7, 2021 in corresponding China Patent Application No. 201880089984.1, 19 pages.

\* cited by examiner

METHOD AND A SYSTEM FOR ESTABLISHING A CONNECTION BETWEEN AN ON-BOARD VEHICLE NETWORK SERVICE AND AN EXTERNAL APPLICATION

CROSS-REFERENCE TO RELATED APPLICATIONS

This application is a U.S. National Stage application of PCT/EP2018/056593, filed Mar. 15, 2018, and published on Sep. 19, 2019, as WO 2019/174738 A1, all of which is hereby incorporated by reference in its entirety

TECHNICAL FIELD

The invention relates to a method and a system for establishing a connection between an on-board vehicle network service and an external application.

The invention can be applied in heavy-duty vehicles, such as trucks, buses and construction equipment. Although the invention will be described with respect to a truck, the invention is not restricted to this particular vehicle, but may also be used in other vehicles.

BACKGROUND

There is an increasing demand for vehicle functionalities requiring an internet connection. Such functionality includes entertainment features such as music and video services, navigation and aid features as well as vehicle diagnostics and software update functionality.

The internet connection may be provided directly by a communication unit of the vehicle equipped with a SIM-card or with other communication functionality. It is also possible to allow the vehicle to connect to internet via a user device acting as a hotspot for the vehicle, sharing its internet connection.

However, it is important to ensure that the vehicle network is secure also when an external device such as a smartphone is used to connect to the invention, and that access to the vehicle network is restricted.

For a connectivity solution to be viable, it is also of importance that the connection can be easily established and managed by the vehicle operator. Accordingly, it is desirable to provide secure and easily manageable method for establishing a connection between a vehicle network and the internet.

SUMMARY

An object of the invention is to provide an improved method for establishing a connection between a vehicle network service and an external application.

According to a first aspect of the invention, the object is achieved by a method according to claim 1.

The first aspect of the invention relates to a method for establishing a connection between a vehicle network service and an external application. The method comprises, in a vehicle, defining a trusted hotspot device external to a vehicle gateway, the trusted hotspot device being connected to the vehicle gateway; in the trusted hotspot device, receiving a request from an application external to the vehicle requesting access to a service on the vehicle network via the vehicle gateway; in the vehicle gateway, determining if the requested vehicle network service is available on the vehicle network; if the requested vehicle network service is available on the vehicle network, configuring the vehicle gateway to allow the requesting external application to communicate with the requested vehicle network service.

The trusted hotspot device may also be referred to as an authorized device, a selected device or a specified device. That the device is trusted or specified should in the present context be interpreted to mean that the device has been specifically and individually selected by a driver or any other vehicle operator to act as a device which is authorized to allow a data connection to be formed between an external application and a vehicle resource/service residing on an internal vehicle network. Accordingly, a human operator is involved in the process of deciding that a device should be a trusted device. Thereby, a privileged mode of networking is opened up to a specific device, and in particular to applications requesting access from or via the trusted device. Moreover, the device is referred to as a hotspot device since it offers internet access to the vehicle.

An advantage of the described method is that a simple and intuitive way of granting access to vehicle network services is provided by means of a method offering a user experience which is easily understandable. In particular, a user will not have to manually configure a vehicle network and vehicle gateway for each and ever application requesting access to the vehicle network. Thereby, an application acting as a data consumer can easily locate and communicate with an application acting as data producer in a vehicle environment. The described method is particularly relevant for trucks and the like where different accessories may be connected to the truck at different points in time, and where each accessory has a unique set of services.

According to one embodiment of the invention, defining the trusted hotspot device may comprise manually defining the hotspot device in network settings of the vehicle gateway. Thereby, the operator is manually verifying that the device is a trusted device. The manual configuration of the network settings may for example consist of entering a name or other identifier of the hotspot device to be trusted.

According to one embodiment of the invention, the requesting application may be an application in the trusted hotspot device. In other words, the requesting application may be a program stored locally on the hotspot device. The requesting application may then be used to acquire information from the vehicle network.

According to one embodiment of the invention, the requesting application may send a request from a remote server via the application in the trusted hotspot device. Thereby, the application in the hotspot acts as an intermediary for the requesting application on a remote server. From the perspective of the vehicle gateway, it is the trusted hotspot device which is requesting access to the vehicle network service, and which is subsequently granted access. Thereby, it is possible to facilitate access for wide range of different applications via the trusted hotspot device.

According to one embodiment of the invention, configuring the vehicle gateway to allow the requesting application to communicate with the requested vehicle network service may comprises automatically allowing the requesting application to communicate with the requested vehicle network service. Thereby, access to the vehicle network service can be automated once a device is defined as a trusted hotspot device.

According to one embodiment of the invention, configuring the vehicle gateway to allow the requesting application to communicate with the requested vehicle network service may comprise prompting an operator of the vehicle to manually allow the requesting application to communicate with the requested vehicle network service. Thereby, an additional layer of security is provided since the operator is prompted to manually approve each application requesting access to the vehicle network. This reduces the risk for unauthorized access to vehicle network services.

According to one embodiment of the invention, configuring the vehicle gateway to allow the requesting application to communicate with the requested vehicle network service may comprises comparing the requesting application with a predetermined list of approved applications, and if the requesting application is on the list of approved applications, allow the requesting application to communicate with the requested vehicle network service. Thereby, there is no need for user interaction to grant access to a vehicle network service which may further improve the security of the vehicle gateway configuration. The list of approved applications may for example be maintained and updated by a fleet operator or a vehicle manufacturer to only allow pre-approved application access to vehicle network services.

According to one embodiment of the invention, configuring the vehicle gateway to allow the requesting application to communicate with the requested vehicle network service may comprise comparing the requesting application with a predetermined list of approved application categories, and if the requesting application belongs to a category on the list of approved application categories, allow the requesting application to communicate with the requested vehicle network service.

According to one embodiment of the invention, the trusted hotspot device may be a smartphone. However, the trusted hotspot device may equally well be a tablet computer, a laptop or the like.

According to a second aspect of the invention, the object is achieved by a system according to claim 12.

The second aspect of the invention relates to a vehicle communication system for establishing a connection between a vehicle network service and an external application. The system comprises: a vehicle gateway arranged in the vehicle; a hotspot device external to the vehicle, wherein the vehicle gateway is configured to define the hotspot device as a trusted hotspot device, the trusted hotspot device being connected to the vehicle gateway; and an application external to the vehicle configured to request access to a vehicle network service via the vehicle gateway, wherein the vehicle gateway is configured to determine if the requested vehicle network service is available on the vehicle network; and if the requested vehicle network service is available on the vehicle network, to configure the vehicle gateway to allow the requesting application to communicate with the requested vehicle network service.

Effects and features of this second aspect of the present invention are largely analogous to those described above in connection with the first aspect of the invention.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

In the present detailed description, various embodiments of the method and system according to the present invention are mainly discussed with reference to a method and system where the trusted hotspot device is a smartphone and where a requesting application is located on a remote server. It should be noted that this by no means limits the scope of the present invention which is equally applicable to other types of devices capable of acting as a hotspot device, such as a tablet computer, a laptop and the like. Moreover, the requesting application may equally well be stored locally on the trusted hotspot device.

Figure 1:
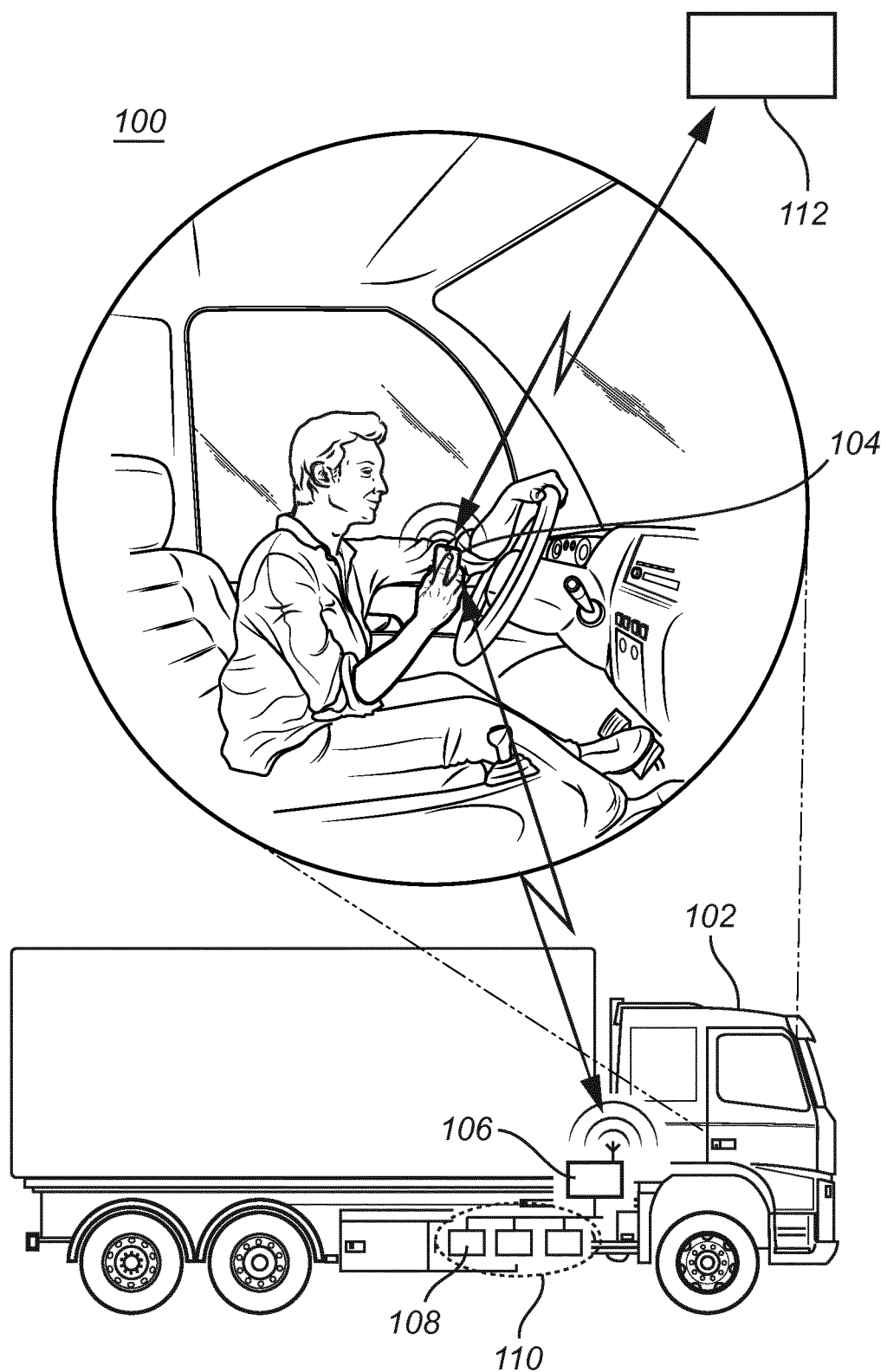
FIG. 1 is a schematic illustration of a vehicle comprising a system according to an embodiment of the invention.

FIG. 1 schematically illustrates a vehicle communication system 100 according to an embodiment of the invention. The system will be described with further reference to FIG. 2 comprising a flow chart outlining the general steps of a method for establishing a connection between a vehicle network service and an external application according to an embodiment of the invention.

The system 100 for establishing a connection between a vehicle network service 108 and an external application comprises a vehicle gateway 106 arranged in the vehicle 102 and a hotspot device 104 external to the vehicle 102. The hotspot device 104 is here illustrated as a smartphone operated by a driver of the vehicle 102. The vehicle gateway 106 is configured to define the hotspot device 104 as a trusted hotspot device 104, wherein the trusted hotspot device 104 is connected to the vehicle gateway 106. That the hotspot device 104 is external to the vehicle 102 means that the hotspot device is not part of the internal vehicle network, where access to the vehicle network 110 is controlled by the vehicle gateway 106. In other words, the vehicle network 110 and services available on the vehicle network 110 are located behind and protected by the vehicle gateway 106.

The vehicle gateway 106 facilitates communication within the vehicle network 100, and the vehicle gateway 106 may function as a data router as well as a central control unit communicating with various vehicle network services 108 which may relate to anything ranging from the powertrain to infotainment systems. Furthermore, the level of security of an on-board vehicle network 110 can be increased by using a vehicle gateway 106.

The system 100 further comprises an application external to the vehicle configured to request access to a vehicle network service 108 via the vehicle gateway 106, wherein the vehicle gateway 106 is configured to determine if the requested vehicle network service 108 is available on the vehicle network 110; and if the requested vehicle network service 108 is available on the vehicle network 110, to configure the vehicle gateway 106 to allow the requesting application to communicate with the requested vehicle network service 108. The requesting application is here illustrated as being located at a remote server 112 which is in communication with the trusted hotspot device 104. However, the requesting application may also be located on the trusted hotspot device 104.

Figure 2:
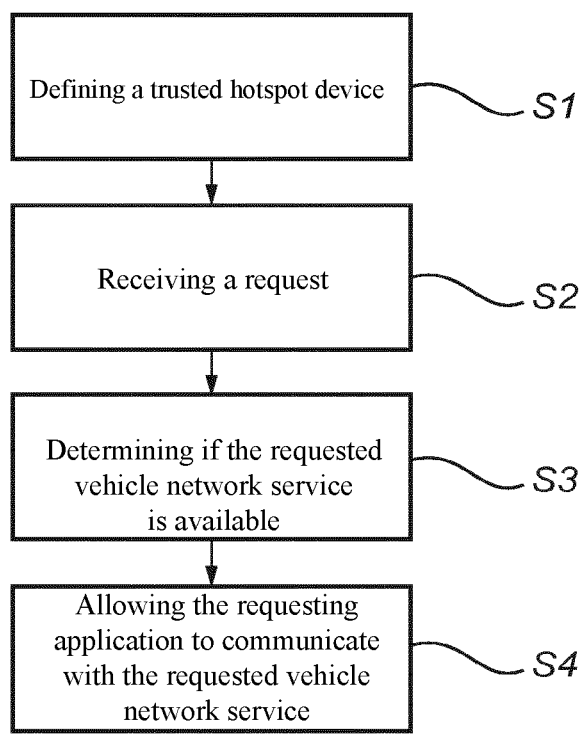
FIG. 2 is a flow chart outlining general steps of a method according to an embodiment of the invention.

The method illustrated by FIG. 2 comprises, in the vehicle 102, defining S1 a trusted hotspot device 104 external to the vehicle gateway 106, the trusted hotspot device 104 being connected to the vehicle gateway 106.

The trusted hotspot device can be seen as an internet gateway accessory (IGA). That is, the trusted hotspot device 104 is a device which is brought on-board to the vehicle 102 and not part of the vehicle proper itself. And by internet gateway, it means there is IP-connectivity established between this IGA and the vehicle 102, whereby the IGA further will facilitate internet access through it. So this IP connectivity (layer-3 in a 7-layer OSI stack) is the primary condition defining the device 104 as a hotspot device. That means, the type of IP connectivity provided is not dependent on the specific layer 1/layer 2 choice. WiFi is a specific layer 1/layer2 choice. Other layer 1/layer 2 choices can also be fine, for example, Bluetooth tethering via PAN (personal area network) profile, or USB tethering, etc. Furthermore, the hotspot device 104 provides an internet connection via a cellular communication network, using e.g. GSM, UMTS, LTE or similar technologies.

Once a device has been defined as a trusted hotspot device 104, it may receive S2 a request from an application external to the vehicle requesting access to a vehicle network service 108 on the vehicle network 110 via the vehicle gateway 106. Next, the method further comprises, in the vehicle gateway 106, determining S3 if the requested vehicle network service 108 is available on the vehicle network 110, and if the requested vehicle network service 108 is available on the vehicle network 110, configuring S4 the vehicle gateway 106 to allow the requesting application to communicate with the requested vehicle network service 108.

The step of determining S3 if the requested vehicle network service 108 is available on the vehicle network 110 can be performed using a service discovery protocol according to industry standards, such as a "bonjour" protocol. The trusted hotspot device 104 will perform discovery and the vehicle gateway 106 will facilitate the discovery so that a node within the vehicle network 110 can receive the discovery request and respond. The vehicle gateway 106 will then facilitate a discovery response back to the trusted hotspot device 104 which in turn provides the response to the requesting application, thereby completing the service discovery.

The configuration of the vehicle gateway 106 may according to one embodiment allow vehicle gateway 106 to automatically facilitate the access for the requesting application. The service discovery may start with looking for a 'service type' (e.g. a printer or a music service). A successful service discovery exchange will discover one or more of offers of the requested service type, aka instance names. Next, the requesting application may select a particular instance and then use service discovery protocol to ask again, in order to learn the IP address and port number of this selected instance of the requested service type. Accordingly, after two successful round-trips, the requesting application has the IP address and the port number to connect to.

Moreover, the described configuration can be performed automatically where every request from the trusted hotspot device 104 is facilitated as long as a node on the vehicle network 110 is offering the requested service.

A more specific approach may involve prompting the operator of the trusted hotspot device 104, e.g. the driver to manually approve a requesting application. This could be done in real time to provide an additional security measure. Alternatively, or in combination, the vehicle 102 could have a set of pre-authorized service types to facilitate. Thereby, the vehicle gateway 106 can automatically configure itself to facilitate access for the requesting application only for pre-authorized applications. Accordingly, the described approach comprises comparing the requesting application with a predetermined list of approved applications, and if the requesting application is on the list of approved applications, allowing the requesting application to communicate with the requested vehicle network service 108.

The vehicle may for example be a truck or a semi-truck and the described method and system may for example be employed for vehicle of a freight company where a third party wishes to enquire regarding the status of a cargo of the vehicle. The vehicle network may then comprise information about a trailer connected to the vehicle and/or about cargo of the vehicle.

The described method and system may advantageously be employed in a fleet environment where a large number of users will be operating a large number of vehicles and vehicle-accessory combinations. In one embodiment of the invention, a fleet application may be installed in a smartphone of a vehicle driver, and once the smartphone is defined as a trusted hotspot device by the driver, the driver can access the required vehicle network services to display relevant vehicle and/or accessory data on the smartphone. Moreover, a fleet management system may request data from the vehicle via the fleet application on the trusted hotspot device.

It is to be understood that the present invention is not limited to the embodiments described above and illustrated in the drawings; rather, the skilled person will recognize that many changes and modifications may be made within the scope of the appended claims.

The invention claimed is:

1. A method for establishing a connection between a vehicle network service and an external application, the method comprising:
    in a vehicle comprising a vehicle network and a vehicle gateway, defining an external hotspot device as a trusted hotspot device, the trusted hotspot device being in communication with the vehicle gateway, the vehicle gateway facilitating communication between the trusted hotspot device and the vehicle network, the vehicle network being arranged on-board the vehicle and comprising a node, the trusted hotspot device being configured to communicate with a remote server through the internet;
    in the trusted hotspot device, receiving a request from an application for access to a vehicle network service offered by the node of the vehicle network, the application being downloaded from the remote server through the internet and located on the trusted hotspot device;
    in the vehicle gateway, making a determination that the requested vehicle network service offered by the node is available on the vehicle network; and
    in the vehicle gateway, configuring the vehicle gateway to allow the requesting application to communicate with the requested vehicle network service offered by the node, based on the determination that the requested vehicle network service is available on the vehicle network,
    wherein configuring the vehicle gateway to allow the requesting application to communicate with the requested vehicle network service offered by the node comprises comparing the requesting application with a predetermined list of approved applications, and allowing the requesting application to communicate with the requested vehicle network service based on a determination that the requesting application is on the predetermined list of approved applications.

2. The method according to claim 1, wherein defining the external hotspot device as a trusted hotspot device comprises manually defining the trusted hotspot device in network settings of the vehicle gateway.

3. The method according to claim 1, wherein the requesting application is an application in the trusted hotspot device.

4. The method according to claim 3, wherein the requesting application sends a request from the remote server via the trusted hotspot device.

5. The method according to claim 1, wherein configuring the vehicle gateway to allow the requesting application to communicate with the requested vehicle network service comprises automatically allowing the requesting application to communicate with the requested vehicle network service.

6. The method according to claim 1, wherein configuring the vehicle gateway to allow the requesting application to communicate with the requested vehicle network service comprises prompting an operator of the vehicle to manually allow the requesting application to communicate with the requested vehicle network service.

7. The method according to claim 1, wherein configuring the vehicle gateway to allow the requesting application to communicate with the requested vehicle network service further comprises comparing the requesting application with a predetermined list of approved application categories, and based on a determination that the requesting application belongs to a category on the predetermined list of approved application categories, allowing the requesting application to communicate with the requested vehicle network service.

8. The method according to claim 1, wherein the trusted hotspot device is a smartphone.

9. The method of claim 1, further comprising:
in the trusted hotspot device, providing to the vehicle gateway a discovery request to determine if the requested vehicle network service is available on the vehicle network; and
in the vehicle gateway, providing the discovery request to the node of the vehicle network offering the vehicle network service, receiving a discovery response from the node in response to the discovery request, and providing the discovery response to the trusted hotspot device.

10. The method of claim 9, further comprising, in the trusted hotspot device, providing the discovery response to the application.

11. A non-transitory storage medium carrying computer instructions, the computer instructions configured to, when executed, by a computer:
define an external hotspot device as a trusted hotspot device, the trusted hotspot device being in communication with the vehicle gateway, the vehicle gateway facilitating communication between the trusted hotspot device and the vehicle network, the vehicle network being arranged on-board the vehicle and comprising a node, the vehicle comprising the vehicle network and the vehicle gateway, the trusted hotspot device being configured to communicate with a remote server through the internet;
receive a request in the trusted hotspot device from an application for access to a vehicle network service offered by the node of the vehicle network, the application being downloaded from the remote server through the internet and located on the trusted hotspot device;
determine in the vehicle gateway that the requested vehicle network service offered by the node is available on the vehicle network; and
configure the vehicle gateway to allow the requesting application to communicate with the requested vehicle network service, based on the determination that the requested vehicle network service is available on the vehicle network;
wherein configuring the vehicle gateway to allow the requesting application to communicate with the requested vehicle network service comprises comparing the requesting application with a predetermined list of approved applications, and allowing the requesting application to communicate with the requested vehicle network service based on a determination that the requesting application is on the predetermined list of approved applications.

12. A vehicle communication system for establishing a connection between a vehicle network service and an external application, the system comprising:
a vehicle gateway arranged in the vehicle, the vehicle gateway facilitating communication between a trusted hotspot device and a vehicle network, the vehicle network being arranged on-board the vehicle and comprising a node, the vehicle comprising the vehicle network and the vehicle gateway;
an external hotspot device external to and separate from the vehicle, wherein the vehicle gateway is configured to define the external hotspot device as a trusted hotspot device, the trusted hotspot device being in communication with the vehicle gateway, the trusted hotspot device being configured to communicate with a remote server through the internet; and
an application configured to make a request for access to the vehicle network service, the vehicle network service offered by the node of the vehicle network, the request received by the trusted hotspot device, the application being downloaded from the remote server through the internet and located on the trusted hotspot device,
wherein the vehicle gateway is configured to make a determination that the requested vehicle network service offered by the node is available on the vehicle network and the vehicle gateway is further configured to allow the requesting application to communicate with the requested vehicle network service, based on the determination that the requested vehicle network service offered by the node is available on the vehicle network,
wherein configuring the vehicle gateway to allow the requesting application to communicate with the node offering the requested vehicle network service comprises comparing the requesting application with a predetermined list of approved applications, and allowing the requesting application to communicate with the requested vehicle network service based on a determination that the requesting application is on the predetermined list of approved applications.

13. The vehicle communication system according to claim 12, further comprising a user interface configured to allow an operator to manually define the trusted hotspot device in network settings of the vehicle gateway.

14. The vehicle communication system according to claim 12, further comprising a remote server comprising an application configured to request access to a vehicle network service via the hotspot device.

15. A vehicle comprising a vehicle communication system according to claim 12.

* * * * *